(12) United States Patent
Noh et al.

(10) Patent No.: US 11,215,991 B2
(45) Date of Patent: Jan. 4, 2022

(54) AUTONOMOUS DRIVING SYSTEM AND METHOD FOR VEHICLES AND VEHICLE INCLUDING THE SAME

(71) Applicants: HYUNDAI MOTOR COMPANY, Seoul (KR); KIA MOTORS CORPORATION, Seoul (KR)

(72) Inventors: Hahk Rel Noh, Bucheon-si (KR); Su Lyun Sung, Seoul (KR); Dae Sung Hwang, Hwaseong-si (KR); Jun Ho Park, Gwangmyeong-si (KR); Cho Rong Ryu, Incheon (KR); Tae Jun Lee, Gwangmyeong-si (KR); Da Yeon Park, Hwaseong-si (KR); Dong Gyu Noh, Hwaseong-si (KR); Jong Rok Park, Suwon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 257 days.

(21) Appl. No.: 16/427,174

(22) Filed: May 30, 2019

(65) Prior Publication Data

US 2020/0183384 A1    Jun. 11, 2020

(30) Foreign Application Priority Data

Dec. 10, 2018   (KR) .......................... 10-2018-0158237

(51) Int. Cl.
*G05D 1/00* (2006.01)
*B60W 50/14* (2020.01)
(Continued)

(52) U.S. Cl.
CPC ........... *G05D 1/0061* (2013.01); *B60W 50/14* (2013.01); *G05D 1/0088* (2013.01); *H04W 4/46* (2018.02);
(Continued)

(58) Field of Classification Search
CPC ............... G05D 1/0061; G05D 1/0088; G05D 2201/0213; B60W 50/14; B60W 2556/65;
(Continued)

(56) References Cited

U.S. PATENT DOCUMENTS

| | | | |
|---|---|---|---|
| 8,744,666 B2* | 6/2014 | Switkes | ................. G08G 1/166 701/28 |
| 2015/0070160 A1* | 3/2015 | Davidsson | ........... G05D 1/0061 340/457 |

(Continued)

FOREIGN PATENT DOCUMENTS

CN         106873589 B  *  3/2020

*Primary Examiner* — Behrang Badii
*Assistant Examiner* — Jay Khandpur
(74) *Attorney, Agent, or Firm* — Morgan, Lewis & Bockius LLP

(57) ABSTRACT

An autonomous driving system for vehicles includes: an autonomous driving controller for controlling autonomous driving of a host vehicle based on information of nearby vehicles and requesting warning and handover upon determining that a failure in autonomous driving of nearby vehicles has occurred; a communication controller for requesting the warning and handover; selecting an emergency target vehicle and requesting a driving mode of following the emergency target vehicle upon receiving autonomous driving failure information; a human-machine interface device for outputting warning and handover information in response to the request of the autonomous driving controller and the communication controller; and a host vehicle driving controller for controlling driving of the host vehicle in response to the request of the autonomous driving controller and the communication controller.

16 Claims, 9 Drawing Sheets

(51) Int. Cl.
*H04W 4/46* (2018.01)
*B60W 60/00* (2020.01)
*B60W 50/00* (2006.01)

(52) U.S. Cl.
CPC ... *B60W 60/005* (2020.02); *B60W 2050/0008* (2013.01); *B60W 2050/143* (2013.01); *B60W 2556/65* (2020.02); *G05D 2201/0213* (2013.01)

(58) Field of Classification Search
CPC ......... B60W 2050/143; B60W 60/005; B60W 2050/008
See application file for complete search history.

(56) References Cited

U.S. PATENT DOCUMENTS

| | | | |
|---|---|---|---|
| 2017/0139411 A1* | 5/2017 | Hartung | G05D 1/0077 |
| 2019/0056733 A1* | 2/2019 | Ferguson | B65G 67/24 |
| 2021/0075800 A1* | 3/2021 | Paraskevas | H04W 4/48 |

* cited by examiner

AUTONOMOUS DRIVING SYSTEM AND METHOD FOR VEHICLES AND VEHICLE INCLUDING THE SAME

CROSS REFERENCE TO RELATED APPLICATION

This application claims the benefit of Korean Patent Application No. 10-2018-0158237, filed on Dec. 10, 2018 in the Korean Intellectual Property Office, which is hereby incorporated by reference as if fully set forth herein.

TECHNICAL FIELD

The present disclosure relates to an autonomous driving system and method for vehicles, and more particularly, to an autonomous driving system and method for vehicles, which may respond to failure in autonomous driving by following a preceding vehicle via vehicle-to-everything (V2X) communication, and a vehicle including the same.

BACKGROUND

In general, driving of a vehicle may signify an overall process from when a driver or a user starts an engine of the vehicle and continuing until the driver or the user turns off the engine of the vehicle.

The term "autonomous vehicle" refer to a vehicle that can autonomously run toward a set destination by recognizing the peripheral environment, determining the driving conditions and controlling itself without driver intervention.

Such an autonomous vehicle may reduce vehicular accidents, may increase transportation efficiency, may save fuel, and may drive autonomously, and thus is expected to serve as a future personal transportation device that may increase convenience in driving.

However, when an autonomous driving system of an autonomous vehicle does not operate normally due to a failure to recognize the peripheral environment, the autonomous vehicle needs to run in a fail-safe mode.

When running in such a fail-safe mode, the autonomous vehicle may follow a trajectory set before the failure. However, because running in the fail-safe mode in this way is not based on real-time information, there is an increased risk of an accident.

Therefore, there is a demand for the development of an autonomous driving system capable of following a preceding vehicle via vehicle-to-everything (V2X) communication in the event of failure in autonomous driving so that a vehicle stably achieves autonomous driving.

SUMMARY

The present disclosure is directed to an autonomous driving system and method for vehicles and a vehicle including the same that substantially obviate one or more problems due to limitations and disadvantages of the related art.

An object of the present disclosure is to provide an autonomous driving system and method for vehicles, which may follow a preceding vehicle via vehicle-to-everything (V2X) communication in the event of failure in autonomous driving so that a host vehicle stably achieves autonomous driving using an autonomous driving controller, which requests warning and control handover upon determining that failure in autonomous driving of nearby vehicles running in the travel path ahead of the host vehicle has occurred, and a communication controller, which makes a request for warning and control handover and for a driving mode of following a selected emergency target vehicle upon receiving autonomous driving failure information from the autonomous driving controller, and to provide a vehicle including the same.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

In accordance with an exemplary embodiment of the present disclosure, an autonomous driving system for vehicles includes: an autonomous driving controller configured to control autonomous driving of a host vehicle based on information of nearby vehicles, the autonomous driving controller requesting warning and handover upon determining that failure in autonomous driving of the nearby vehicles running in a travel path ahead of the host vehicle has occurred; a communication controller configured to receive the information of the nearby vehicles and to transmit the information of the nearby vehicles to the autonomous driving controller, upon receiving autonomous driving failure information from the autonomous driving controller, the communication controller requesting warning and handover, selecting an emergency target vehicle, and requesting a driving mode of following the emergency target vehicle; a human-machine interface (HMI) device configured to output warning and handover information in response to the request of the autonomous driving controller and the communication controller; and a host vehicle driving controller configured to control driving of the host vehicle in response to the request of the autonomous driving controller and the communication controller.

In accordance with another exemplary embodiment of the present disclosure, an autonomous driving method using an autonomous driving system for vehicles, wherein the system includes an autonomous driving controller, a communication controller, an HMI device and a host vehicle driving controller communicatively connected to each other, includes: receiving, by the autonomous driving controller, information of nearby vehicles from the communication controller; controlling, by the autonomous driving controller, autonomous driving of a host vehicle based on the information of the nearby vehicles; determining, by the autonomous driving controller, whether a failure in autonomous driving of the nearby vehicles running in a travel path ahead of the host vehicle has occurred; upon determining that the failure in autonomous driving of the nearby vehicles has occurred, requesting, by the autonomous driving controller, warning and handover to the HMI device; and requesting, by the autonomous driving controller, the host vehicle driving controller to perform safe-mode driving.

In accordance with a further another exemplary embodiment of the present disclosure, an autonomous driving method using an autonomous driving system for vehicles, wherein the system includes an autonomous driving controller, a communication controller, an HMI device and a host vehicle driving controller communicatively connected to each other, includes: receiving, by the communication controller, information of nearby vehicles; transmitting, by the communication controller, the information of the nearby vehicles to the autonomous driving controller; receiving, by the communication controller, autonomous driving failure information from the autonomous driving controller; requesting, by the communication controller, warning and handover to the HMI device; selecting, by the communication controller, an emergency target vehicle; and requesting, by the communication controller, the host vehicle driving controller to perform a driving mode of following the emergency target vehicle.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

Figure 1:
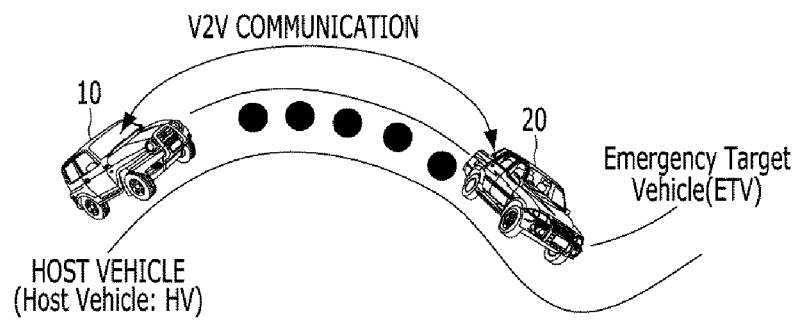
FIGS. 1 to 4 are conceptual views showing an autonomous driving system for vehicles according to an exemplary embodiment of the present disclosure.

Hereinafter, exemplary embodiments of the present disclosure will be described in detail with reference to the accompanying drawings so as for those skilled in the art to easily carry out the embodiments. The present disclosure may, however, be embodied in many different forms, and should not be construed as being limited to the embodiments set forth herein. In the drawings, parts irrelevant to the description of the present disclosure will be omitted for clarity. Like reference numerals refer to like elements throughout the specification.

Throughout the specification, unless explicitly described to the contrary, the word "include" and variations such as "includes" or "including" will be understood to imply the inclusion of stated elements but not the exclusion of any other elements. In addition, the terms "-er", "-or" and "module" used in the specification mean units for processing at least one function and operation and can be implemented by hardware components or software components and combinations thereof.

Throughout the specification, unless explicitly described to the contrary, the word "include" and variations such as "includes" or "including" will be understood to imply the inclusion of stated elements but not the exclusion of any other elements. In addition, the same reference numerals used throughout the specification refer to the same constituent elements.

Hereinafter, an autonomous driving system and method for vehicles and a vehicle including the same according to the embodiments of the present disclosure will be described in detail with reference to FIGS. 1 to 12.

FIGS. 1 to 4 are conceptual views showing an autonomous driving system for vehicles according to an exemplary embodiment of the present disclosure.

Figure 2:
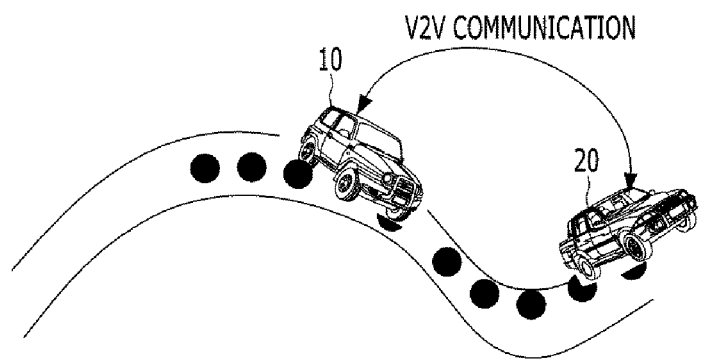

As shown in FIGS. 1 and 2, the autonomous driving system of the present disclosure may select a preceding vehicle traveling ahead of a host vehicle 10 as an emergency target vehicle 20 before the autonomous driving of the host vehicle 10 fails, may receive information of the selected emergency target vehicle 20 via vehicle-to-everything (V2X) communication, and may track the emergency target vehicle 20.

Further, when the autonomous driving of the host vehicle 10 is not normally realized, the autonomous driving system of the present disclosure may perform control such that the host vehicle 10 tracks the emergency target vehicle 20 along the path along which the emergency target vehicle 20 travels until normal autonomous driving of the host vehicle 10 is realized.

That is, in the event of failure in autonomous driving, the autonomous driving system of the present disclosure may select a preceding vehicle as an emergency target vehicle and may track the selected emergency target vehicle via V2X communication.

Figure 3:
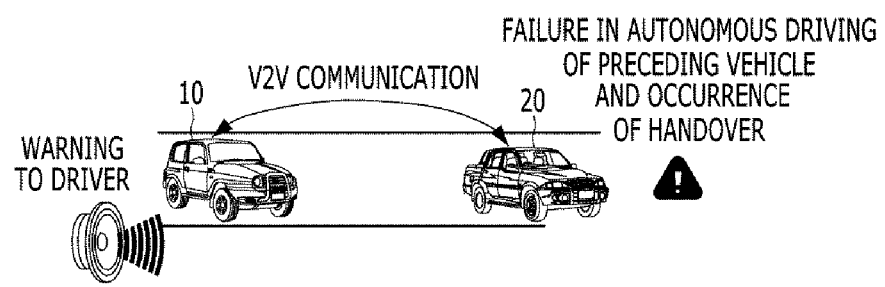
Figure 4:
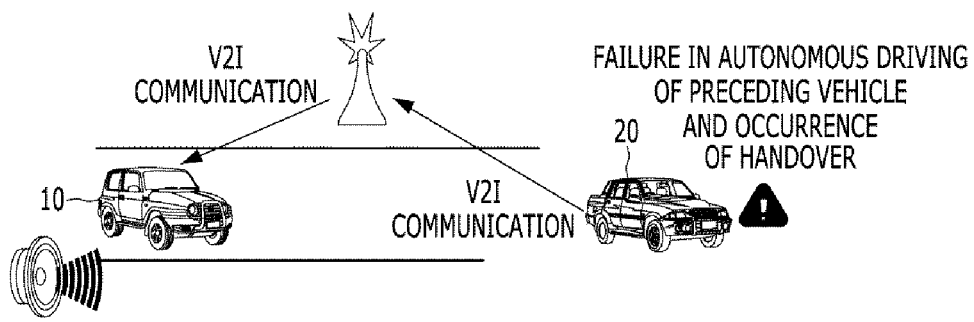

Further, as shown in FIGS. 3 and 4, when the autonomous driving of the preceding vehicle fails and handover occurs, the autonomous driving system of the present disclosure may give warning to the driver of the host vehicle 10 and may hand over control to the driver.

In unfavorable conditions such as bad weather, road construction or a map information error, the possibility of failure in autonomous driving becomes high. Thus, the host vehicle and other nearby vehicles are highly likely to undergo failure in autonomous driving at the same location or at the same time point.

Therefore, if the autonomous driving system receives information about failure in autonomous driving of the preceding autonomous vehicle via V2X communication and warns the driver of the host vehicle of the possibility of failure in autonomous driving based on the received information, it is possible to enable the driver to stably drive the vehicle by inducing handover of control to the driver before the driver is placed in danger.

To this end, the autonomous driving system of the present disclosure may receive information about failure in autonomous driving of the preceding autonomous vehicle via vehicle-to-vehicle/vehicle-to-infrastructure (V2V/V2I) communication and may perform warning and handover of control to the driver of the host vehicle 10.

That is, the autonomous driving system of the present disclosure may receive driving information of nearby vehicles (V2V) and traffic information from infrastructure (V2I) via V2X communication, and in the event of failure in autonomous driving of the preceding vehicle, may immediately warn the driver and may enable handover of control to the driver.

Further, during normal autonomous driving, the autonomous driving system of the present disclosure may implement autonomous driving of the host vehicle based on path history (PH) information of nearby vehicles and map information of the host vehicle. In the event of failure in autonomous driving of the host vehicle, the autonomous driving system of the present disclosure may determine a target vehicle, which is an emergency target vehicle that the host vehicle will follow, and may track the determined target vehicle.

Subsequently, in the event of failure in autonomous driving of the host vehicle, the autonomous driving system of the present disclosure may perform control such that the host vehicle follows the emergency target vehicle based on the real-time or stored travel path and speed of the emergency target vehicle until handover of control to the driver is performed or until the autonomous driving becomes normal.

Figure 5:
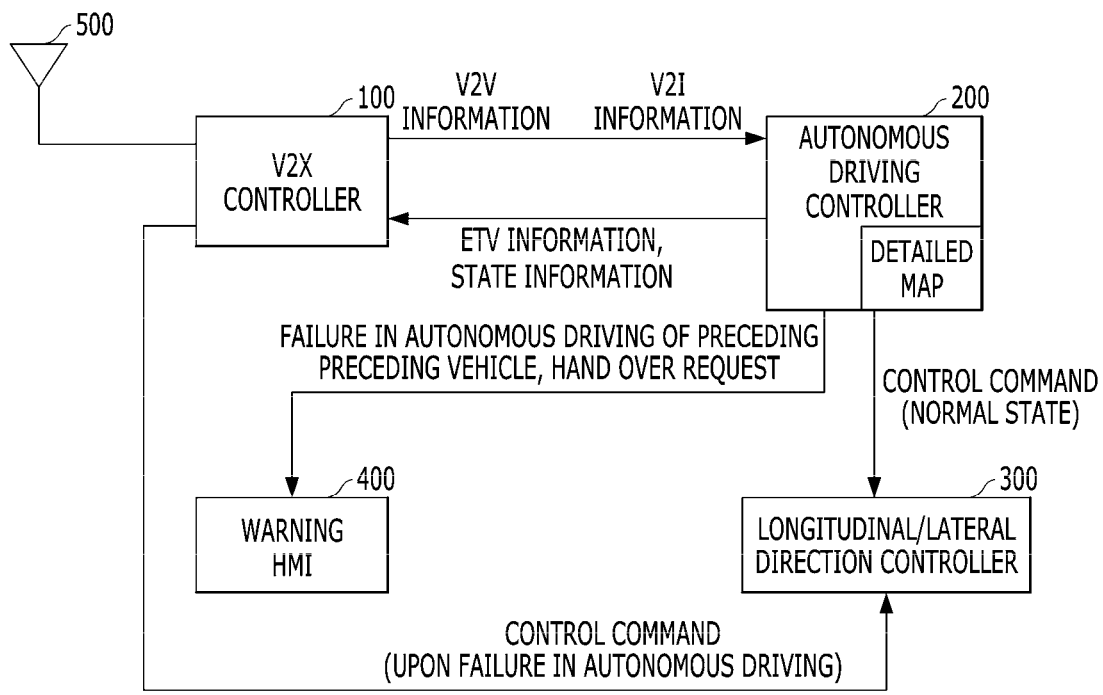
FIG. 5 is a block diagram showing the construction of the autonomous driving system for vehicles according to an exemplary embodiment of the present disclosure.

FIG. 5 is a block diagram showing the construction of the autonomous driving system for vehicles according to an exemplary embodiment of the present disclosure.

As shown in FIG. 5, the autonomous driving system of the present disclosure may include an autonomous driving controller 200, a communication controller 100, a human-machine interface (HMI) device 400, and a host vehicle driving controller 300.

In addition, the autonomous driving system of the present disclosure may further include a V2X antenna for receiving information of nearby vehicles.

Here, the autonomous driving controller 200 may control the autonomous driving of the host vehicle based on information of nearby vehicles received from the communication controller 100, and upon determining that failure in autonomous driving of nearby vehicles running in the travel path ahead of the host vehicle has occurred, may make a request for warning and control handover through the HMI device 400.

At this time, the autonomous driving controller 200 may receive information of nearby vehicles, which includes driving information and infrastructure information, from the communication controller 100.

For example, the driving information may include an ID of the nearby vehicle, GPS location information of the nearby vehicle, state information of the nearby vehicle, path history information of the nearby vehicle, and autonomous driving information of the nearby vehicle, without limitation thereto.

Here, the state information of the nearby vehicle may include speed information, heading information, brake operation information, and turn signal information, without limitation thereto.

The autonomous driving information of the nearby vehicle may include information indicating whether autonomous driving or manual driving is being performed and flag information indicating whether control handover has occurred, without limitation thereto.

The infrastructure information may include failure information of the nearby vehicle.

Here, the failure information of the nearby vehicle may include the GPS location and ID of the disabled vehicle, without limitation thereto.

The autonomous driving controller 200 may determine failure in autonomous driving of the nearby vehicle based on the information of the nearby vehicle received from the communication controller 100.

After a request for warning and control handover, the autonomous driving controller 200 may request the host vehicle driving controller 300 to perform safe-mode driving so that the host vehicle runs in a safe mode.

For example, upon determining that failure in autonomous driving of the preceding autonomous vehicle running in the travel path ahead of the host vehicle has occurred based on the information received from the communication controller 100, the autonomous driving controller 200 may output a warning and a request for control handover to the driver through the HMI device 400 and may operate the autonomous driving system in a safe mode in consideration of the danger that may be caused by the preceding autonomous vehicle.

Here, the safe mode of the autonomous driving system may include speed reduction, a no-passing mode, defensive driving, and the like.

The autonomous driving controller 200 may select a tracking target vehicle and may transmit information of the selected tracking target vehicle to the communication controller 100.

In order to select a tracking target vehicle, the autonomous driving controller 200 may extract path information of preceding vehicles from information of nearby vehicles, may extract an autonomous driving target path of the host vehicle from the map information of the host vehicle, may compare the extracted path information of the preceding vehicles with the extracted autonomous driving target path of the host vehicle, may classify preceding vehicles having the same path information as the autonomous driving target path of the host vehicle, and may select a tracking target vehicle from among the classified preceding vehicles.

For example, when selecting a tracking target vehicle from among the classified preceding vehicles, the autonomous driving controller 200 may select, from among the classified preceding vehicles, the vehicle running the closest distance from the host vehicle in the lane of the host vehicle.

Further, the autonomous driving controller 200 may determine whether the vehicle running the closest distance from the host vehicle in the lane of the host vehicle is an autonomous vehicle, and upon determining that the vehicle is an autonomous vehicle, may additionally select the non-autonomous vehicle running the closest distance from the host vehicle in the lane of the host vehicle.

Subsequently, when selecting a tracking target vehicle from among the classified preceding vehicles, if there is no vehicle running in the lane of the host vehicle among the classified preceding vehicles, the autonomous driving controller 200 may select the vehicle running the closest distance from the host vehicle in an adjacent lane.

Further, the autonomous driving controller 200 may transmit information of the selected tracking target vehicle to the communication controller 100 at every calculation time point.

For example, the autonomous driving controller 200 may compare the path information of the preceding vehicles received from the communication controller 100 with the autonomous driving target path of the host vehicle received from the map information of the host vehicle and may classify preceding vehicles running in the same path as the host vehicle.

Subsequently, the autonomous driving controller 200 may select one or two emergency target vehicles (ETVs) from among the classified vehicles at a prescribed period (e.g. about 100 msec) by combining the following conditions.

The first condition may be to select the vehicle running the closest distance from the host vehicle in the lane of the host vehicle.

When the vehicle selected in the first condition is an autonomous vehicle, the second condition may be to additionally select the non-autonomous vehicle running the closest distance from the host vehicle in the lane of the host vehicle.

When there is no vehicle that meets the first condition or the second condition in the lane of the host vehicle, the third condition may be to select the vehicle running the closest distance from the host vehicle in an adjacent lane.

The autonomous driving controller 200 may transmit the information of the emergency target vehicle to the communication controller 100 at every calculation time point, and the communication controller 100 may store an emergency target vehicle list in a memory provided therein.

The communication controller 100, which is a V2X controller, may receive information of nearby vehicles through the V2X antenna 500 and may transmit the received information to the autonomous driving controller 200. When receiving autonomous driving failure information from the autonomous driving controller 200, the communication controller 100 may make a request for warning and control handover, may select an emergency target vehicle, and may make a request for a driving mode of following the selected emergency target vehicle.

The communication controller 100 may receive information of nearby vehicles (including autonomous driving failure information of autonomous vehicles), which are running ahead of the host vehicle, via V2V/V2I communication, may store the received information, and may transmit the information to the autonomous driving controller 200 at a prescribed period (e.g. about 100 msec).

Further, the communication controller 100 may receive information of the tracking target vehicle from the autonomous driving controller 200, may store the received information of the tracking target vehicle in a memory provided therein, and may generate an emergency target vehicle list.

After receiving information of nearby vehicles, the communication controller 100 may extract information of the tracking target vehicle, which is selected as the emergency target vehicle, from the information of the nearby vehicles, may accumulate the extracted information of the tracking target vehicle to generate a history, and may store the generated history in a memory provided therein.

When the existing tracking target vehicle, which was selected as the emergency target vehicle, is substituted with a new tracking target vehicle, the communication controller 100 may generate a history of the new tracking target vehicle based on the prestored information of the existing tracking target vehicle.

When generating the history of the new tracking target vehicle, the communication controller 100 may use the information of the existing tracking target vehicle up to the time point of generation of the history of the new tracking target vehicle.

Further, the communication controller 100 may effectively maintain the history information of the target vehicle located ahead of the host vehicle among the history information of the tracking target vehicle and may delete the history information of the target vehicle located at the rear of the host vehicle.

For example, the communication controller 100 may generate a history by accumulating the latest information of GPS locations, speeds, accelerations, steering angles and yaw rates of the emergency target vehicles, received via V2V communication, and may store the history in a memory.

When the existing emergency target vehicle is changed due to path deviation thereof or the like, the communication controller 100 may generate a history of a new emergency target vehicle utilizing the information of the existing emergency target vehicle stored in the communication controller 100. At this time, the communication controller 100 may use the history information of the existing emergency target vehicle so as to correspond to the history information of the new emergency target vehicle.

Here, the history information of an emergency target vehicle ahead of the host vehicle may be effectively maintained, but the history information of an emergency target vehicle at the rear of the host vehicle may be deleted from the memory.

When receiving the information of failure in autonomous driving from the autonomous driving controller 200, the communication controller 100 may receive an autonomous driving failure signal from the autonomous driving controller 200. When not receiving a response signal from the autonomous driving controller 200 within a prescribed time period, the communication controller 100 may determine that failure in autonomous driving has occurred.

The communication controller 100 may make a request for a driving mode of following the selected emergency target vehicle until control handover is performed or until the autonomous driving of the host vehicle is performed.

When making a request for a driving mode of following the selected emergency target vehicle, if only an emergency target vehicle running in a non-autonomous mode is present, the communication controller 100 may make a request for a driving mode of following the emergency target vehicle running in a non-autonomous mode.

Further, when making a request for a driving mode of following the selected emergency target vehicle, if an emergency target vehicle running in a non-autonomous mode and an emergency target vehicle running in an autonomous mode are present, the communication controller 100 may make a request for a driving mode of following the emergency target vehicle running in an autonomous mode, and in the event of failure in autonomous driving of the emergency target vehicle running in an autonomous mode, may make a request for a driving mode of following the emergency target vehicle running in a non-autonomous mode.

After the selection of the emergency target vehicle, the communication controller 100 may extract information of the selected emergency target vehicle from the received information of the nearby vehicles, may store the extracted information of the emergency target vehicle in the history of the emergency target vehicle, and may make a request for a driving mode of following the selected emergency target vehicle based on the stored history of the emergency target vehicle.

Here, when making a request for a driving mode of following the selected emergency target vehicle, if the speed information in the history of the emergency target vehicle, which was stored at the location of the host vehicle, is higher than the speed of the host vehicle, the communication controller 100 may make a request for a driving mode of maintaining the current speed of the host vehicle.

When receiving a failure signal from the autonomous driving controller 200 of the host vehicle or after not receiving a response from the autonomous driving controller 200 within a prescribed time period, the communication controller 100 may warn the driver of control handover through the HMI device 400.

The communication controller 100 may select an emergency target vehicle and may perform control such that the host vehicle follows the selected emergency target vehicle until handover of control to the driver is performed or until the autonomous driving becomes normal.

When only an emergency target vehicle running in a non-autonomous mode is present, the communication controller 100 may select this non-autonomous emergency target vehicle as the emergency target vehicle that the host vehicle will follow.

Alternatively, when an emergency target vehicle running in an autonomous mode is present but the autonomous driving of this emergency target vehicle fails, the communication controller 100 may select a non-autonomous emergency target vehicle as the emergency target vehicle that the host vehicle will follow.

After selecting the emergency target vehicle in the event of failure in autonomous driving, the communication controller 100 may immediately extract information of the selected emergency target vehicle from the information received via V2V communication and may store the extracted information in the history of the emergency target vehicle.

The communication controller 100 may transmit a vehicle control command to the host vehicle driving controller 300, which is a longitudinal/lateral direction controller, based on the history information of the emergency target vehicle so that the host vehicle follows the location and speed of the emergency target vehicle.

When the speed in the history of the emergency target vehicle, which was stored at the location of the host vehicle, is higher than the speed of the host vehicle, the communication controller 100 may perform control such that the current speed of the host vehicle is maintained.

The HMI device 400 may output warning and handover information in response to the request of the autonomous driving controller 200 and the communication controller 100.

The host vehicle driving controller 300 may include a longitudinal/lateral direction controller, an electronic stability controller (ESC), and a motor-driven power steering (MDPS) controller, and may control the driving of the host vehicle in response to the request of the autonomous driving controller 200 and the communication controller 100.

As such, the autonomous driving system of the present disclosure may receive driving information of nearby vehicles (V2V) and traffic information from infrastructure (V2I) via V2X communication, and in the event of failure in autonomous driving of the preceding vehicle, may immediately warn the driver and may enable handover of control to the driver.

Further, during normal autonomous driving, the autonomous driving system of the present disclosure may implement the autonomous driving of the host vehicle based on the path history PH information of nearby vehicles and map information of the host vehicle. In the event of failure in autonomous driving of the host vehicle, the autonomous driving system of the present disclosure may determine a target vehicle, which is an emergency target vehicle that the host vehicle will follow, and may track the determined target vehicle.

Subsequently, in the event of failure in autonomous driving of the host vehicle, the autonomous driving system of the present disclosure may perform control such that the host vehicle follows the emergency target vehicle based on the real-time or stored travel path and speed of the emergency target vehicle until handover of control to the driver is performed or until the autonomous driving becomes normal.

Therefore, the present disclosure makes it possible to follow a preceding vehicle via V2X communication in the event of failure in autonomous driving so that the host vehicle stably achieves autonomous driving using the autonomous driving controller, which requests warning and handover upon determining that failure in autonomous driving of nearby vehicles running in the travel path ahead of the host vehicle has occurred, and the communication controller, which makes a request for warning and handover and for a driving mode of following the selected emergency target vehicle upon receiving autonomous driving failure information from the autonomous driving controller.

That is, during autonomous driving of the host vehicle, the present disclosure is capable of immediately receiving information of risk factors, such as failure in autonomous driving of other autonomous vehicles running in the travel path of the host vehicle, via V2X communication, thereby securing defensive driving of the driver and the autonomously running host vehicle and consequently increasing the safety of the autonomously running host vehicle.

In addition, according to the present disclosure, in the event of failure in autonomous driving, the V2X communication controller controls the vehicle such that the vehicle stably achieves autonomous driving, thereby increasing the safety of the vehicle.

Figure 6:
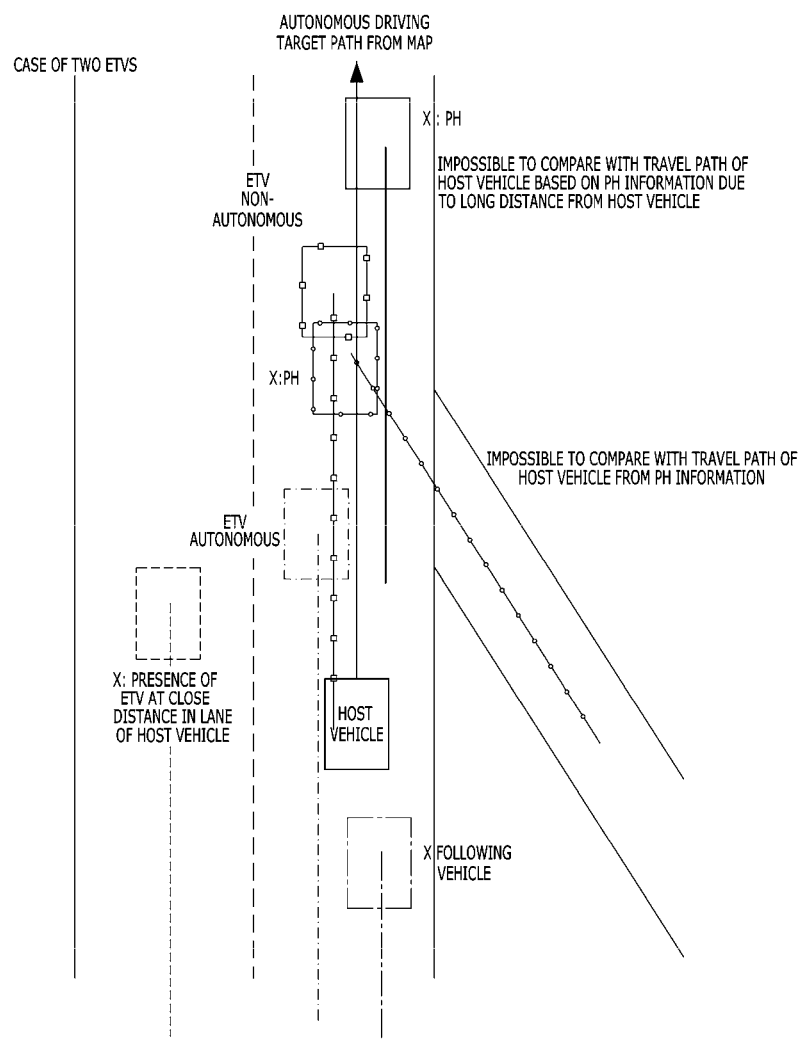
FIGS. 6 to 8 are views showing the process of selecting a tracking target vehicle.
Figure 7:
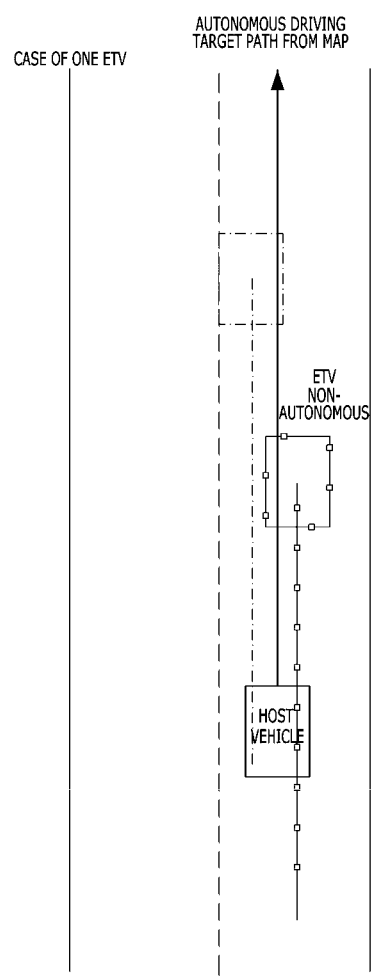
Figure 8:
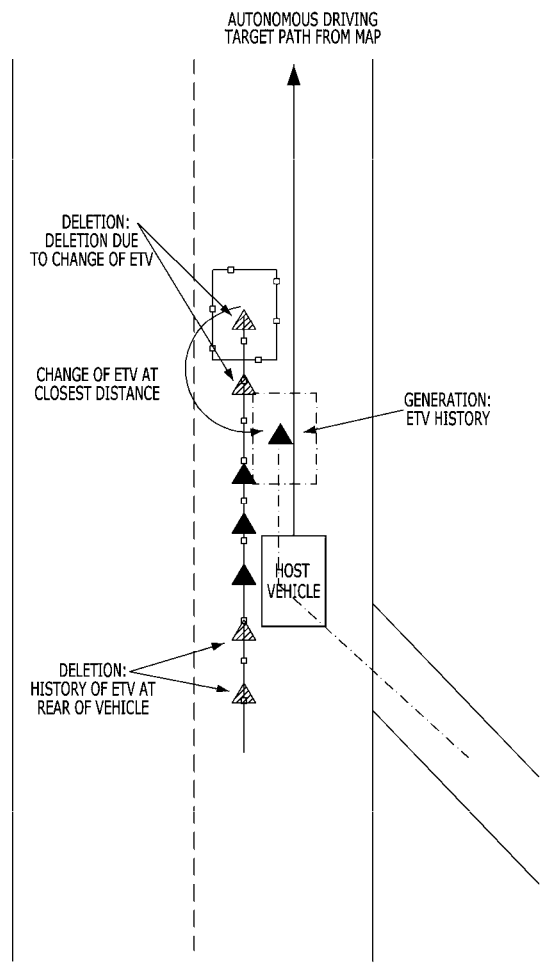

FIGS. 6 to 8 are views showing the process of selecting a tracking target vehicle.

As shown in FIGS. 6 and 7, the autonomous driving controller may compare the path information of the preceding vehicles received from the communication controller with the autonomous driving target path of the host vehicle received from the map information of the host vehicle and may classify preceding vehicles running in the same path as the host vehicle.

Subsequently, the autonomous driving controller may select one or two emergency target vehicles from among the classified vehicles at a prescribed period (e.g. about 100 msec) by combining the following conditions.

The first condition may be to select the vehicle running the closest distance from the host vehicle in the lane of the host vehicle. When the vehicle selected in the first condition is an autonomous vehicle, the second condition may be to additionally select the non-autonomous vehicle running the closest distance from the host vehicle in the lane of the host vehicle. When there is no vehicle that meets the first condition or the second condition in the lane of the host vehicle, the third condition may be to select the vehicle running the closest distance from the host vehicle in an adjacent lane.

In addition, the autonomous driving controller may transmit information of the selected emergency target vehicle to the communication controller at every calculation time point, and the communication controller may store an emergency target vehicle list in a memory provided therein.

As shown in FIG. 8, the communication controller may generate a history by accumulating the latest information of GPS locations, speeds, accelerations, steering angles and yaw rates of the emergency target vehicles, received via V2V communication and may store the history in a memory.

When the existing emergency target vehicle is changed due to path deviation thereof or the like, the communication controller may generate a history of a new emergency target vehicle utilizing the information of the existing emergency target vehicle stored in the communication controller. At this time, the communication controller may use the history information of the existing emergency target vehicle so as to correspond to the history information of the new emergency target vehicle.

Here, the history information of an emergency target vehicle ahead of the host vehicle may be effectively maintained, but the history information of an emergency target vehicle at the rear of the host vehicle may be deleted from the memory.

Figure 9:
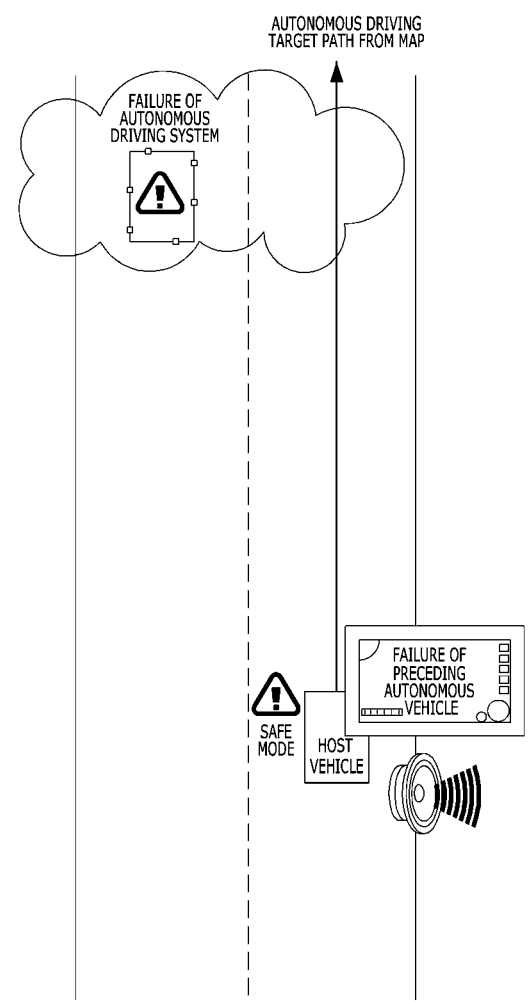
FIG. 9 is a view showing the driving process of a host vehicle in the event of failure in autonomous driving of a preceding autonomous vehicle.

FIG. 9 is a view showing the driving process of the host vehicle in the event of failure in autonomous driving of a preceding autonomous vehicle.

As shown in FIG. 9, upon determining that failure in autonomous driving of the preceding autonomous vehicle running in the travel path ahead of the host vehicle has occurred based on the information received from the communication controller, the autonomous driving controller may output a warning and a request for control handover to the driver through the HMI device and may operate the autonomous driving system in a safe mode in consideration of the danger that may be caused by the preceding autonomous vehicle.

Here, the safe mode of the autonomous driving system may include speed reduction, a no-passing mode, defensive driving, and the like.

Figure 10:
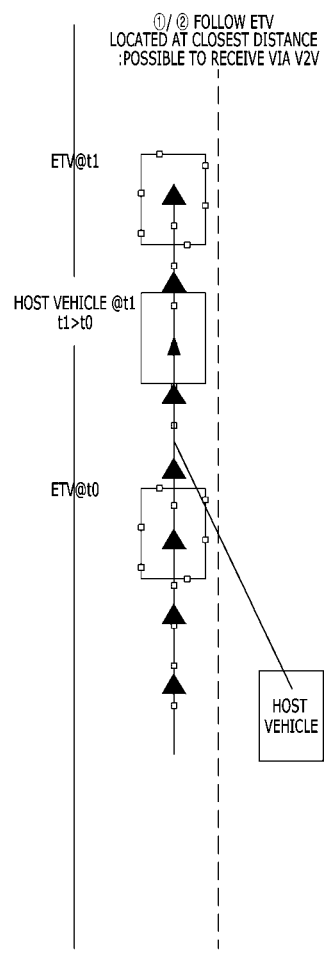
FIG. 10 is a view showing the process of selecting an emergency target vehicle in the event of failure in autonomous driving of the host vehicle.

FIG. 10 is a view showing the process of selecting an emergency target vehicle in the event of failure in autonomous driving of the host vehicle.

As shown in FIG. 10, when receiving a failure signal from the autonomous driving controller of the host vehicle or after not receiving a response from the autonomous driving controller within a prescribed time period, the communication controller may warn the driver of control handover through the HMI device.

The communication controller may select an emergency target vehicle and may perform control such that the host vehicle follows the selected emergency target vehicle until handover of control to the driver is performed or until the autonomous driving becomes normal.

When only an emergency target vehicle running in a non-autonomous mode is present, the communication controller may select this non-autonomous emergency target vehicle as the emergency target vehicle that the host vehicle will follow.

Alternatively, in the case in which an emergency target vehicle running in an autonomous mode is present but the autonomous driving of this emergency target vehicle fails, the communication controller may select a non-autonomous emergency target vehicle as the emergency target vehicle that the host vehicle will follow.

Figure 11:
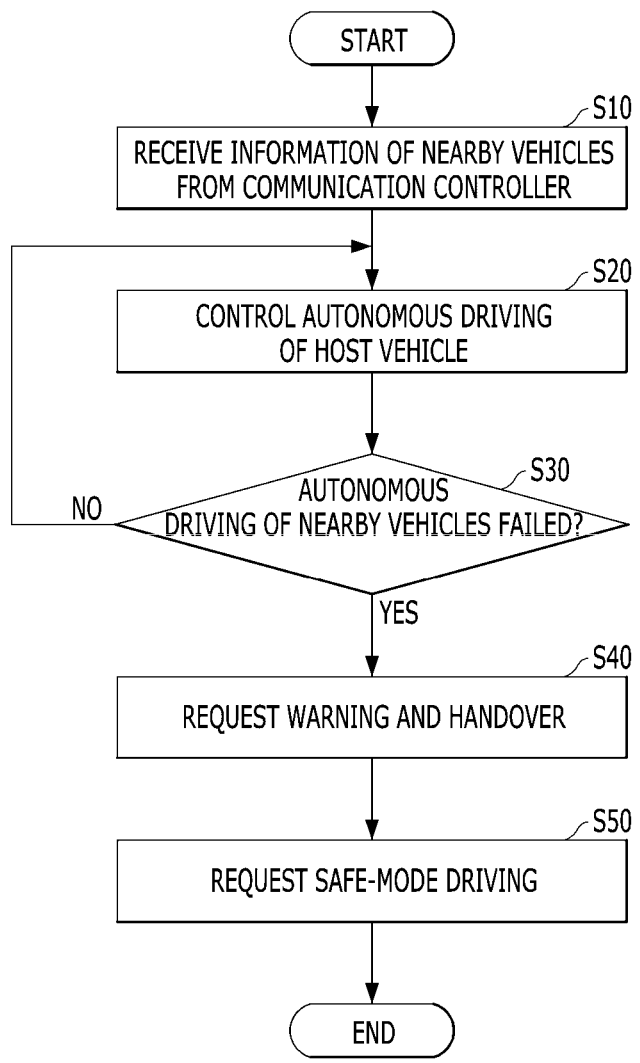
FIGS. 11 and 12 are flowcharts showing an autonomous driving method of the autonomous driving system for vehicles according to an exemplary embodiment of the present disclosure.
Figure 12:
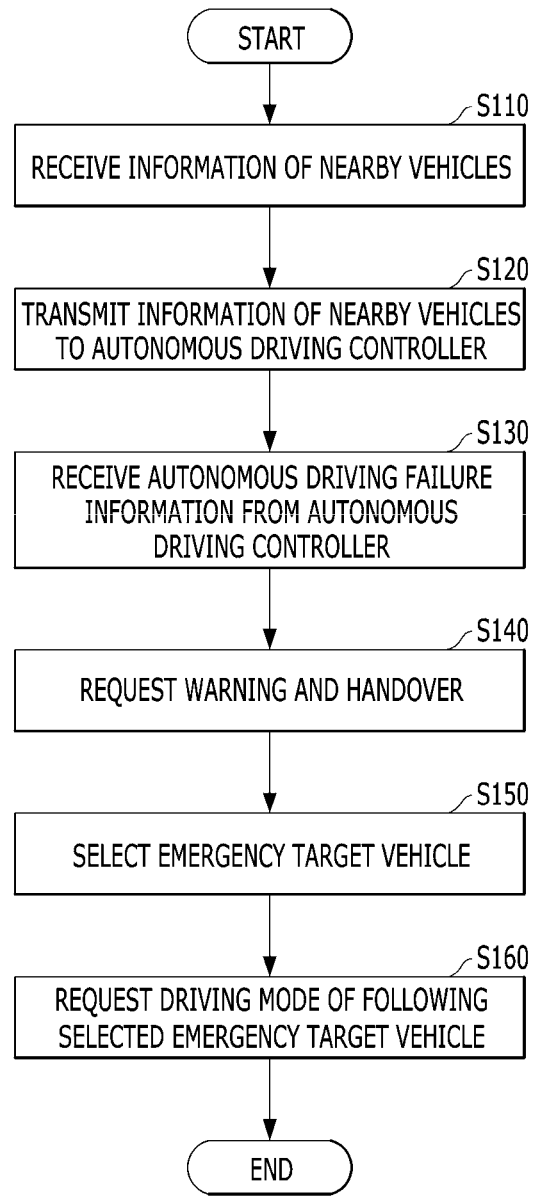

FIGS. 11 and 12 are flowcharts showing the autonomous driving method of the autonomous driving system for vehicles according to an exemplary embodiment of the present disclosure.

FIG. 11 is a flowchart showing the process of responding to reception of an autonomous driving failure signal of a preceding autonomous vehicle.

As shown in FIG. 11, the autonomous driving controller according to the present disclosure may receive information of nearby vehicles from the communication controller (S10).

The autonomous driving controller may receive information of nearby vehicles, which includes driving information and infrastructure information, from the communication controller.

For example, the driving information may include an ID of the nearby vehicle, GPS location information of the nearby vehicle, state information of the nearby vehicle, path history information of the nearby vehicle, and autonomous driving information of the nearby vehicle, without limitation thereto.

Here, the state information of the nearby vehicle may include speed information, heading information, brake operation information, and turn signal information, without limitation thereto.

The autonomous driving information of the nearby vehicle may include information indicating whether autonomous driving or manual driving is being performed and flag information indicating whether control handover has occurred, without limitation thereto.

The infrastructure information may include failure information of the nearby vehicle.

Here, the failure information of the nearby vehicle may include GPS location and ID of the disabled vehicle, without limitation thereto.

The autonomous driving controller according to the present disclosure may control the autonomous driving of the host vehicle based on the information of the nearby vehicle (S20).

Subsequently, the autonomous driving controller according to the present disclosure may determine whether failure in autonomous driving of the nearby vehicle running in the travel path ahead of the host vehicle has occurred (S30).

Here, the autonomous driving controller may determine failure in autonomous driving of the nearby vehicle based on the information of the nearby vehicle received from the communication controller.

Next, upon determining that failure in autonomous driving of the nearby vehicle has occurred, the autonomous driving controller according to the present disclosure may request warning and handover to the HMI device (S40).

Next, the autonomous driving controller according to the present disclosure may request the host vehicle driving controller to perform safe-mode driving (S50).

Depending on the embodiment, the present disclosure may further include a step of selecting, by the autonomous driving controller, a tracking target vehicle and a step of transmitting, by the autonomous driving controller, information of the selected tracking target vehicle to the communication controller.

Here, the step of selecting the tracking target vehicle may include a step of extracting path information of preceding vehicles from information of nearby vehicles and extracting an autonomous driving target path of the host vehicle from the map information of the host vehicle, a step of comparing the extracted path information of the preceding vehicles with the extracted autonomous driving target path of the host vehicle, a step of classifying preceding vehicles having the same path information as the autonomous driving target path of the host vehicle, and a step of selecting a tracking target vehicle from among the classified preceding vehicles.

The step of selecting a tracking target vehicle from among the classified preceding vehicles may include a step of selecting the vehicle running the closest distance from the host vehicle in the lane of the host vehicle from among the classified preceding vehicles.

Further, the step of selecting a tracking target vehicle from among the classified preceding vehicles may include a step of determining whether the vehicle running the closest distance from the host vehicle in the lane of the host vehicle is an autonomous vehicle, and upon determining that the vehicle is an autonomous vehicle, may further include a step of additionally selecting the non-autonomous vehicle running the closest distance from the host vehicle in the lane of the host vehicle.

If there is no vehicle running in the lane of the host vehicle among the classified preceding vehicles, the step of selecting a tracking target vehicle from among the classified preceding vehicles may include a step of selecting the vehicle running the closest distance from the host vehicle in an adjacent lane.

The step of transmitting information of the selected tracking target vehicle to the communication controller may include a step of transmitting information of the selected tracking target vehicle at every calculation time point.

FIG. 12 is a flowchart showing the process of selecting an emergency target vehicle in the event of failure in autonomous driving of the host vehicle.

As shown in FIG. 12, the communication controller according to the present disclosure may receive information of nearby vehicles (S110).

After receiving information of nearby vehicles, the communication controller may extract information of the tracking target vehicle, which is selected as the emergency target vehicle, from the information of the nearby vehicles, may accumulate the extracted information of the tracking target vehicle to generate a history, and may store the generated history in a memory provided therein.

When the existing tracking target vehicle, which was selected as the emergency target vehicle, is substituted with a new tracking target vehicle, the communication controller may generate a history of the new tracking target vehicle based on the prestored information of the existing tracking target vehicle.

The step of generating the history of the new tracking target vehicle may include a step of using the information of the existing tracking target vehicle up to the time point of generation of the history of the new tracking target vehicle.

The communication controller may effectively maintain the history information of the target vehicle located ahead of the host vehicle among the history information of the tracking target vehicle and may delete the history information of the target vehicle located at the rear of the host vehicle.

Further, the communication controller may receive information of the tracking target vehicle selected as the emergency target vehicle from the autonomous driving controller, may store the received information of the tracking target vehicle in a memory provided therein, and may generate an emergency target vehicle list.

The communication controller according to the present disclosure may transmit the information of the nearby vehicles to the autonomous driving controller (S120).

Subsequently, the communication controller according to the present disclosure may receive autonomous driving failure information from the autonomous driving controller (S130).

In the step of receiving autonomous driving failure information from the autonomous driving controller, the communication controller may determine that failure in autonomous driving has occurred upon receiving an autonomous driving failure signal from the autonomous driving controller or after not receiving a response signal from the autonomous driving controller within a prescribed time period.

Next, the communication controller according to the present disclosure may request warning and handover to the HMI device (S140).

Subsequently, the communication controller according to the present disclosure may select an emergency target vehicle (S150).

Subsequently, the communication controller according to the present disclosure may request the host vehicle driving controller to perform a driving mode of following the selected emergency target vehicle (S160).

The step of requesting a driving mode of following the selected emergency target vehicle may include a step of requesting a driving mode of following the selected emergency target vehicle until handover is performed or until the autonomous driving of the host vehicle becomes normal.

The step of requesting a driving mode of following the selected emergency target vehicle may include, if only an emergency target vehicle running in a non-autonomous mode is present, requesting a driving mode of following the emergency target vehicle running in a non-autonomous mode.

The step of requesting a driving mode of following the selected emergency target vehicle may include, if an emergency target vehicle running in a non-autonomous mode and an emergency target vehicle running in an autonomous mode are present, requesting a driving mode of following the emergency target vehicle running in an autonomous mode, and if the autonomous driving of the emergency target vehicle running in an autonomous mode fails, requesting a driving mode of following the emergency target vehicle running in a non-autonomous mode.

The step of requesting a driving mode of following the selected emergency target vehicle may include a step of extracting information of the selected emergency target vehicle from the received information of the nearby vehicles, a step of storing the extracted information of the emergency target vehicle in the history of the emergency target vehicle, and a step of requesting a driving mode of following the selected emergency target vehicle based on the stored history of the emergency target vehicle.

Here, the step of requesting a driving mode of following the selected emergency target vehicle may further include, if the speed information in the history of the emergency target vehicle, which was stored at the location of the host vehicle, is higher than the speed of the host vehicle, requesting a driving mode of maintaining the current speed of the host vehicle.

In addition, there is provided a computer-readable recording medium, in which a program for implementing the autonomous driving method of the autonomous driving system for vehicles according to the present disclosure is recorded, and the computer-readable recording medium may perform the process provided by the autonomous driving method according to an exemplary embodiment of the present disclosure.

A vehicle according to an exemplary embodiment of the present disclosure may include a plurality of control devices communicatively connected to each other, and an autonomous driving system configured to control autonomous driving to follow a preceding vehicle via communication with the plurality of control devices. The autonomous driving system may include an autonomous driving controller configured to control autonomous driving of a host vehicle based on information of nearby vehicles, the autonomous driving controller requesting warning and handover upon determining that failure in autonomous driving of nearby vehicles running in the travel path ahead of the host vehicle has occurred, a communication controller configured to receive the information of the nearby vehicles and to transmit the information of the nearby vehicles to the autonomous driving controller, upon receiving autonomous driving failure information from the autonomous driving controller, the communication controller requesting warning and handover, selecting an emergency target vehicle, and requesting a driving mode of following the selected emergency target vehicle, a human-machine interface (HMI) device configured to output warning and handover information in response to the request of the autonomous driving controller and the communication controller, and a host vehicle driving controller configured to control the driving of the host vehicle in response to the request of the autonomous driving controller and the communication controller.

As is apparent from the above description, according to the autonomous driving system and method for vehicles and the vehicle including the same related to at least one embodiment of the present disclosure constructed as described above, it is possible to follow a preceding vehicle via V2X communication in the event of failure in autonomous driving so that the host vehicle stably achieves autonomous driving using the autonomous driving controller, which requests warning and handover upon determining that failure in autonomous driving of nearby vehicles running in the travel path ahead of the host vehicle has occurred, and the communication controller, which makes a request for warning and handover and for a driving mode of following a selected emergency target vehicle upon receiving autonomous driving failure information from the autonomous driving controller.

That is, during autonomous driving of the host vehicle, the present disclosure is capable of immediately receiving information of risk factors, such as failure in autonomous driving of other autonomous vehicles running in the travel path of the host vehicle, via V2X communication, thereby securing defensive driving of the driver and the autonomously running host vehicle and consequently increasing the safety of the autonomously running host vehicle.

In addition, according to the present disclosure, in the event of failure in autonomous driving, the V2X communication controller controls the vehicle such that the vehicle stably achieves autonomous driving, thereby increasing the safety of the vehicle.

The present disclosure described above may be implemented as a computer-readable code of a computer-readable medium in which programs are recorded. The computer-readable medium includes all kinds of recording devices in which data that may be read by a computer system is stored. Examples of the computer-readable medium may include a hard disk drive (HDD), a solid-state disk (SSD), a silicon disk drive (SDD), ROM, RAM, a CD-ROM, a magnetic tape, a floppy disk, and an optical data storage device. In addition, the computer-readable recording medium includes a carrier wave (e.g. data transmission over the Internet).

It will be appreciated by those skilled in the art that the effects achievable through the present disclosure are not limited to those that have been specifically described hereinabove, and other effects of the present disclosure will be more clearly understood from the detailed description above.

Accordingly, the detailed description above is not intended to be construed to limit the present disclosure in all aspects, but is to be considered by way of example. The scope of the present disclosure should be determined by reasonable interpretation of the accompanying claims, and all equivalent modifications made without departing from the scope of the present disclosure should be included in the following claims.

What is claimed is:

1. An autonomous driving system for vehicles comprising:
   an autonomous driving controller configured to control autonomous driving of a host vehicle based on information of nearby vehicles, the autonomous driving controller requesting warning and handover upon determining that a failure in autonomous driving of nearby vehicles running in a travel path ahead of the host vehicle has occurred;
   a communication controller configured to receive the information of the nearby vehicles and to transmit the information of the nearby vehicles to the autonomous driving controller, wherein the communication controller, upon receiving autonomous driving failure information from the autonomous driving controller, requests warning and handover, selects an emergency target vehicle, and requests a driving mode of following the emergency target vehicle;
   a human-machine interface (HMI) device configured to output warning and handover information in response to the request of the autonomous driving controller and the communication controller; and
   a host vehicle driving controller configured to control driving of the host vehicle in response to the request of the autonomous driving controller and the communication controller.

2. The autonomous driving system according to claim 1, wherein, after the warning and handover has been requested, the autonomous driving controller requests the host vehicle driving controller to perform safe-mode driving to allow the host vehicle to run in a safe mode.

3. The autonomous driving system according to claim 1, wherein the autonomous driving controller selects a tracking target vehicle and transmits information of the selected tracking target vehicle to the communication controller.

4. The autonomous driving system according to claim 3, wherein, when selecting the tracking target vehicle, the autonomous driving controller extracts path information of preceding vehicles from the information of the nearby vehicles, extracts an autonomous driving target path of the host vehicle from map information of the host vehicle, compares the path information of the preceding vehicles with the autonomous driving target path of the host vehicle, classifies preceding vehicles having same path information as the autonomous driving target path of the host vehicle, and selects the tracking target vehicle from among the classified preceding vehicles.

5. The autonomous driving system according to claim 1, wherein, after receiving the information of the nearby vehicles, the communication controller extracts information of a tracking target vehicle, which is selected as the emergency target vehicle, from the information of the nearby vehicles, accumulates the information of the tracking target vehicle to generate a history, and stores the history in a memory of the communication controller.

6. The autonomous driving system according to claim 1, wherein, when receiving the autonomous driving failure information from the autonomous driving controller, the communication controller determines that the failure in autonomous driving has occurred upon receiving an autonomous driving failure signal from the autonomous driving controller or after not receiving a response signal from the autonomous driving controller within a prescribed period of time.

7. The autonomous driving system according to claim 1, wherein the communication controller requests the driving mode of following the emergency target vehicle until the handover is performed or until the autonomous driving of the host vehicle is performed.

8. The autonomous driving system according to claim 1, wherein, when requesting the driving mode of following the emergency target vehicle, if only an emergency target vehicle running in a non-autonomous mode is present, the communication controller requests the driving mode of following the emergency target vehicle which is running in the non-autonomous mode.

9. The autonomous driving system according to claim 1, wherein, when requesting the driving mode of following the emergency target vehicle, if an emergency target vehicle running in a non-autonomous mode and an emergency target vehicle running in an autonomous mode are present, the communication controller requests the driving mode of following the emergency target vehicle which is running in the autonomous mode, and wherein, when autonomous driving of the emergency target vehicle running in the autonomous mode fails, the communication controller requests the driving mode of following the emergency target vehicle which is running in the non-autonomous mode.

10. The autonomous driving system according to claim 1, wherein, after selecting the emergency target vehicle, the communication controller extracts information of the emergency target vehicle from the information of the nearby vehicles, stores the information of the emergency target vehicle in a history of the emergency target vehicle, and requests the driving mode of following the emergency target vehicle based on the history of the emergency target vehicle.

11. An autonomous driving method using an autonomous driving system for vehicles, wherein the autonomous driving system includes an autonomous driving controller, a communication controller, an HMI device and a host vehicle driving controller communicatively connected to each other, the autonomous driving method comprising steps of:

receiving, by the communication controller, information of nearby vehicles running in a travel path ahead of a host vehicle;

transmitting, by the communication controller, the information of the nearby vehicles to the autonomous driving controller;

receiving, by the communication controller, autonomous driving failure information from the autonomous driving controller;

requesting, by the communication controller, warning and handover to the HMI device;

selecting, by the communication controller, an emergency target vehicle; and requesting, by the communication controller, the host vehicle driving controller to perform a driving mode of following the emergency target vehicle.

12. The autonomous driving method according to claim 11, further comprising steps of:

receiving, by the communication controller, information of a tracking target vehicle, which is selected as the emergency target vehicle, from the autonomous driving controller;

storing, by the communication controller, the received information of the tracking target vehicle in a memory of the communication controller; and generating, by the communication controller, an emergency target vehicle list.

13. The autonomous driving method according to claim 11, further comprising, after the step of receiving information of nearby vehicles:

extracting, by the communication controller, information of a tracking target vehicle, which is selected as the emergency target vehicle, from the information of the nearby vehicles;

accumulating, by the communication controller, the information of the tracking target vehicle to generate a history; and storing, by the communication controller, the history in a memory of the communication controller.

14. The autonomous driving method according to claim 11, wherein the step of requesting the host vehicle driving controller to perform a driving mode of following the emergency target vehicle comprises, if only an emergency target vehicle running in a non-autonomous mode is present, requesting the driving mode of following the emergency target vehicle which is running in the non-autonomous mode.

15. The autonomous driving method according to claim 11, wherein the step of requesting the host vehicle driving controller to perform a driving mode of following the emergency target vehicle comprises:

if an emergency target vehicle running in a non-autonomous mode and an emergency target vehicle running in an autonomous mode are present, requesting the driving mode of following the emergency target vehicle which is running in the autonomous mode; and when autonomous driving of the emergency target vehicle running in the autonomous mode fails, requesting the driving mode of following the emergency target vehicle which is running in the non-autonomous mode.

16. The autonomous driving method according to claim 11, wherein the step of requesting the host vehicle driving controller to perform a driving mode of following the emergency target vehicle comprises, after the selecting the emergency target vehicle:

extracting information of the emergency target vehicle from the received information of the nearby vehicles;

storing the information of the emergency target vehicle in a history of the emergency target vehicle; and requesting the driving mode of following the emergency target vehicle based on the stored history of the emergency target vehicle.

* * * * *